(12) United States Patent
Kempinski

(10) Patent No.: US 10,082,863 B2
(45) Date of Patent: Sep. 25, 2018

(54) GAZE-BASED AUTOMATIC SCROLLING

(71) Applicant: Umoove Services Ltd., Jerusalem (IL)

(72) Inventor: Yitzchak Kempinski, Geva Binyamin (IL)

(73) Assignee: Umoove Services Ltd., Jerusalem (IL)

( * ) Notice: Subject to any disclaimer, the term of this patent is extended or adjusted under 35 U.S.C. 154(b) by 668 days.

(21) Appl. No.: 14/400,350

(22) PCT Filed: May 12, 2013

(86) PCT No.: PCT/IL2013/050411
§ 371 (c)(1),
(2) Date: Nov. 11, 2014

(87) PCT Pub. No.: WO2013/168173
PCT Pub. Date: Nov. 14, 2013

(65) Prior Publication Data
US 2015/0128075 A1    May 7, 2015

Related U.S. Application Data

(60) Provisional application No. 61/645,723, filed on May 11, 2012, provisional application No. 61/645,752, filed on May 11, 2012.

(51) Int. Cl.
*G06F 3/01* (2006.01)
*G06F 3/0485* (2013.01)
*G06F 3/0484* (2013.01)

(52) U.S. Cl.
CPC ............. *G06F 3/013* (2013.01); *G06F 3/012* (2013.01); *G06F 3/017* (2013.01); *G06F 3/0485* (2013.01); *G06F 3/04845* (2013.01)

(58) Field of Classification Search
CPC ............................. G06F 3/013; G06F 3/0485
See application file for complete search history.

(56) References Cited

U.S. PATENT DOCUMENTS 5,850,211 A    12/1998  Tognazzini
6,421,064 B1    7/2002  Lemelson et al.
(Continued)

FOREIGN PATENT DOCUMENTS

WO    WO 2007/017784    2/2007
WO    WO 2012/138744    10/2012
(Continued)

*Primary Examiner* — William Bashore
*Assistant Examiner* — Nathan Shrewsbury
(74) *Attorney, Agent, or Firm* — Pearl Cohen Zedek Latzer Baratz LLP

(57) ABSTRACT

Embodiments of the invention may include a method of scrolling content on an electronic display upon detection that a gaze of a user is pointed to a pre-defined area of the display, such as for example an edge of the display. A scroll may be triggered by the gaze point of the user being directed to the pre-defined area of the screen or on a plane of the screen. A scroll may move the displayed content by a fixed amount or by a distance that is sufficient to bring the gaze point of the user our of the pre-defined area that triggered the scroll. A scroll may continue for example so long as a smooth pursuit of the viewers eyes is maintained. Embodiments may include tracking a position of a viewer of an electronic display, and altering an orientation of a one or more elements of the display to correspond to the changed orientation of the user. A layout of content that is display may be altered to accommodate the change in orientation. In some embodiments, an orientation of the displayed content may changed in real time to match the change in orientation of the user. In some embodiments, a resting or permanent orientation may be adopted once the position of the user becomes fixed.

18 Claims, 9 Drawing Sheets

(56) References Cited

U.S. PATENT DOCUMENTS

| | | | | |
|---|---|---|---|---|
| 8,933,938 B2* | 1/2015 | Khan | | G06F 3/013 345/440 |
| 9,323,325 B2* | 4/2016 | Perez | | G02B 27/017 |
| 9,952,663 B2* | 4/2018 | Kempinski | | G06F 3/012 |
| 2002/0180799 A1* | 12/2002 | Peck | | G06F 3/013 715/784 |
| 2006/0110008 A1 | 5/2006 | Vertegaal et al. | | |
| 2010/0066763 A1* | 3/2010 | MacDougall | | G06F 1/1626 345/656 |
| 2011/0182472 A1* | 7/2011 | Hansen | | A61B 3/113 382/103 |
| 2011/0228975 A1* | 9/2011 | Hennessey | | A61B 3/113 382/103 |
| 2011/0248987 A1* | 10/2011 | Mitchell | | G06T 15/20 345/419 |
| 2012/0105486 A1* | 5/2012 | Lankford | | G06F 3/013 345/661 |
| 2012/0188148 A1* | 7/2012 | DeJong | | G02B 27/0093 345/8 |
| 2013/0127980 A1* | 5/2013 | Haddick | | G06F 3/013 348/14.08 |
| 2013/0128364 A1* | 5/2013 | Wheeler | | A61B 3/113 359/630 |
| 2013/0219012 A1* | 8/2013 | Suresh | | G09G 5/14 709/217 |
| 2013/0243258 A1* | 9/2013 | Hennessey | | A61B 3/113 382/103 |
| 2013/0246331 A1 | 9/2013 | Helfman et al. | | |
| 2013/0286178 A1* | 10/2013 | Lewis | | A61B 3/113 348/78 |
| 2013/0321265 A1* | 12/2013 | Bychkov | | G06F 3/013 345/156 |
| 2014/0313129 A1* | 10/2014 | Elvesjo | | G06F 1/3287 345/156 |
| 2015/0149956 A1* | 5/2015 | Kempinski | | G06F 3/017 715/784 |
| 2015/0289762 A1* | 10/2015 | Popovich | | G02B 27/0093 351/209 |

FOREIGN PATENT DOCUMENTS

| WO | WO 2013/111140 | 8/2013 |
|---|---|---|
| WO | WO 2014/061017 | 4/2014 |

* cited by examiner

GAZE-BASED AUTOMATIC SCROLLING

CROSS-REFERENCE TO RELATED APPLICATIONS

This application is a National Phase Application of PCT International Application No. PCT/IL2013/050411, International Filing Date May 12, 2013, which in turn claims the benefit of U.S. provisional patent application No. 61/645,723 filed on May 11, 2012 and which also claims the benefit of U.S. provisional patent application No. 61/645,752 filed on May 11, 2012, all of which are incorporated in their entirety herein by reference.

FIELD OF THE INVENTION

The present invention relates to gaze-based operation of a device. More particularly, the present invention relates to gaze-based automatic scrolling of an image displayed by the device.

BACKGROUND OF THE INVENTION

Screen display size on many mobile devices is limited. Such limited size may limit the amount of text or images that may be comfortably viewed before a scrolling of the display is required.

SUMMARY OF THE INVENTION

Embodiments of the invention may include a method for scrolling content that is displayed on an electronic display screen by tracking a direction or point of a gaze of a viewer of the displayed content, and when a gaze point in a plane of the display screen and corresponding to the tracked gaze direction is moved into predefined region in the plane of the display screen, automatically scrolling the displayed content on the display screen in a manner indicated by tracked gaze direction.

Some embodiments may include acquiring a images of the viewer with an imaging device that is positioned at known location relative to the display screen or at a plane external to the display screen.

Some embodiments may include altering a speed of the scrolling to a rate that allows a user to maintain a smooth pursuit of the content being scrolled.

Some embodiments may include tracking a position of an iris of the viewer relative to a position of an object in 3D space, and calculating a gaze point of the iris.

In some embodiments a predefined region may adjoin an edge of the display screen or a boundary of a display window.

In some embodiments, a scroll may continue so long as the gaze direction or gaze point is in said pre-defined region or so long as the iris of the user is in a smooth pursuit of the displayed content.

In some embodiments, scrolling the displayed content may include causing a portion of the displayed content that is displayed at the gaze point to move a location that is nearer to a center of the displayed content.

In some embodiments, scrolling the displayed content includes causing a portion of the displayed content that is displayed at the gaze point to move a location that is nearer to a center of a comfort range.

Embodiments of the invention may include an electronic device having a display screen to display scrollable content, an imaging device to acquire a series of images of a viewer of the display screen where the screen is at a known position relative to the display screen; and a processor to track a point of a gaze of the viewer from the acquired images, determine when the tracked gaze point is at a predefined area; and scroll the displayed content on the in a manner indicated by tracked gaze point.

Embodiments of the invention may include a method for adjusting an orientation of an image being displayed on a display screen by acquiring an image of a body part of a viewer of the displayed image, calculating an orientation of the imaged body part; and aligning an orientation of the displayed image relative to the orientation of the body part.

Embodiments of the invention may include a system having an electronic display screen for displaying an image; an image capture device at a known orientation to the display screen; and a processor to analyze an image, acquired by the image capture device, of a viewer of the displayed image to calculate an orientation of an imaged body part of the viewer, compare the calculated orientation to an orientation of the displayed image; and alter the orientation of the displayed image to correspond to the orientation of an imaged body part.

Embodiments of the invention include a method for scrolling content that is displayed on an electronic display screen, including tracking a direction of a gaze of a viewer of the displayed content, when a gaze point in a plane of the display screen and corresponding to the tracked gaze direction is moved into predefined region in the plane of the display screen, automatically scrolling the displayed content on the display screen in a manner indicated by tracked gaze direction.

In some embodiments, tracking the direction of the gaze includes acquiring a plurality of successive images of the viewer by an imaging device that is positioned at known location relative to the display screen.

In some embodiments, a method includes altering a speed of the scrolling to reflect a smooth pursuit of an eye of the viewer.

In some embodiments, tracking the direction of the gaze includes tracking a position of an iris of the user relative to a position of an object in three-dimensional space, and calculating a gaze point of the iris based on the tracked position of the iris.

In some embodiments, the predefined region adjoins an edge of the display screen.

In some embodiments, the predefined region adjoins a boundary of a display window.

In some embodiments, the method includes continuing the scroll so long when the gaze direction is in the pre-defined region.

In some embodiments, the method includes continuing the scroll when an iris of the viewer is in a smooth pursuit of the displayed content.

In some embodiments, the predefined region lies external to an edge of the display screen.

In some embodiments, scrolling the displayed content includes causing a portion of the displayed content that is displayed at the gaze point to move to a location that is nearer to a center of the displayed content.

In some embodiments, scrolling the displayed content includes causing a portion of the displayed content that is displayed at the gaze point to move to a location that is nearer to a center of a predetermined comfort range.

In some embodiments, scrolling the displayed content includes scrolling the displayed content in a scroll direction that is directed away from the gaze point and toward a center of the displayed content.

In some embodiments, tracking the direction of the gaze includes calculating a displacement vector from an initial position to the gaze point.

In some embodiments, scrolling the displayed content includes scrolling the content at a scrolling rate that is determined by a magnitude of the displacement vector.

In some embodiments, scrolling the displayed content includes scrolling the content through a distance that is determined by a magnitude of the displacement vector.

In some embodiments, scrolling the displayed content includes scrolling the content in a direction that is determined by a direction of the displacement vector.

In some embodiments, scrolling the displayed content includes scrolling the content through a distance that is sufficient to display in its entirety a screen object at the gaze point.

In some embodiments, scrolling the displayed content includes scrolling the content only after the gaze point remains in the predefined region for a predetermined period of time.

Embodiments of the invention include an electronic device including a display screen, configurable to display scrollable content, an imager, located at a known position relative to the display screen and configurable to acquire a series of images of a viewer of the display screen, and a processor, configured to track a point of a gaze of the viewer from the series of acquired images, determine when the tracked gaze point is at a predefined area, and scroll the displayed content on the display screen in a manner indicated by tracked gaze point.

In some embodiments, the processor is configured to track the gaze point by estimating an expected size and expected location of an image of an iris within that acquired image, and determining a location of the iris image within the acquired image by identifying a region within the expected location, the size of the region being consistent with the expected size, wherein pixels of the region have luminance values that are darker than pixels of other regions within the expected location.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
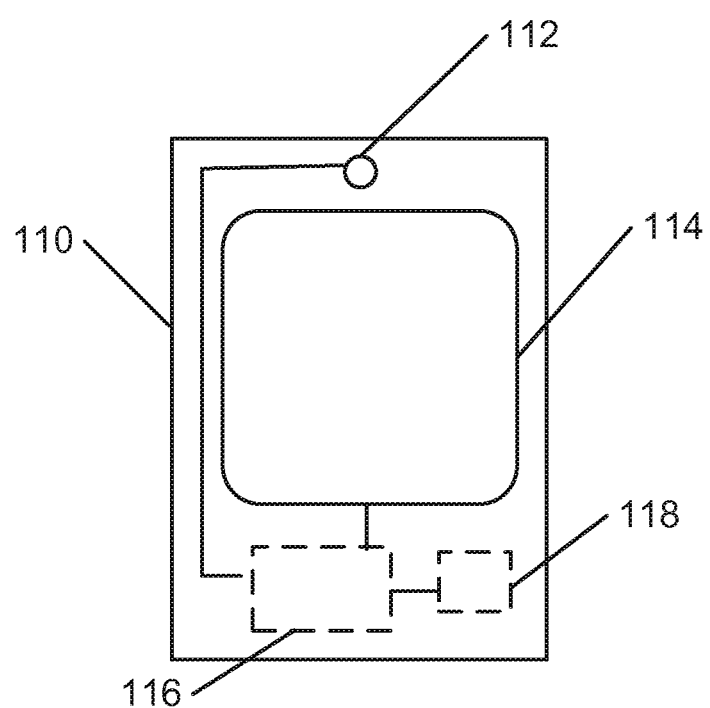
FIG. 1 is a schematic diagram of a device that may be configured for gesture-based control, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

In accordance with embodiments of the present invention, a direction or point of gaze of a user of a device may be tracked. The device includes an electronic display screen. Content that is displayed on the display screen may be scrolled in accordance with the tracked gaze direction or gaze point. The displayed content may include a section of an electronic document. For example, the user's gaze may be directed toward a region of the displayed content that is displayed near an edge of the display screen. As a result, the displayed content may be automatically scrolled such that the content being displayed in the region at which the gaze is directed is moved toward the center of the display screen. Display of adjacent sections of the document may be modified accordingly. For example, a section of the document that was not previously displayed may be displayed adjacent to the moved section on the side toward the aforementioned edge. A section of the document that was previously displayed near an edged opposite the aforementioned edge is no longer displayed.

A scrolling operation mimics the effect of relative motion between a frame or window through which a document is viewed on the one hand, and the document being viewed through the window on the other. (Scrolling may be variously referred to in different contexts as panning or browsing.) Thus, scrolling changes the displayed content by not displaying some previously (prior to scrolling) displayed content, by displaying other previously displayed content at new positions, and by displaying content that was not previously displayed. However, it may be convenient to describe or picture scrolling as moving a displayed document so as to bring a previously hidden region of the document into view, while a previously displayed region is moved out of view.

As used herein, "document" may, in addition to its regular meaning, refer to any document, image, user interface, or other displayable textual or graphic content, and of which a portion may be displayed on a display screen. A change in the displayed portion to an adjacent portion of a document is herein referred to as "scrolling." Scrolling, as used herein, may include panning a picture or image, or may include browsing a user interface so as to sequentially select ordered items. For example, browsing may include selecting for display a next or previous image in an image gallery, or selecting for display a next or previous document page or article in a list.

Gaze-based automatic scrolling in accordance with embodiments of the present invention may be advantageous over contact-based manual scrolling (e.g., by manual operation of a control, such as a pointing device, a touch screen, or a key). For example, in the case of a small display screen (e.g., of a mobile device), where frequent scrolling may be required, contact-based manual scrolling could be tedious, bothersome, or feel unnatural. When the user's hands are otherwise occupied, contact-based manual scrolling could by impossible or inconvenient.

In accordance with embodiments of the present invention, the user's point or direction of gaze may be determined by analysis of an image of the user. For example, an image of the user may be acquired by an imaging device that is associated with (e.g., incorporated into the same device or mobile device as, or otherwise located at fixed or determinable position relative to) the display screen. The imaging device may include a camera, infra-red imager or detector, a video camera, a stereo camera arrangement, or any other imaging device capable of imaging the user's eyes or face in a suitable spectral range (e.g., visible or infrared).

Analysis of the image may determine a position of the user's eyes, e.g., relative to the imaging device and relative to one or more other parts or features of the user's face, head, or body. A direction or point of gaze may be derived from analysis of the determined positions.

For example, a direction of gaze may be calculated or estimated using an eye or gaze tracking technology, such as those marketed under the names Mirametrix S2 Eye Tracker, Tobii T60 eye tracking technology, or another system or technology. For example, an eye image may be detected in an acquired face image using an eye tracking method that is described in PCT application No. PCT/IL2013/050072, which is incorporated in its entirety herein by reference. Other eye detection or gaze tracking techniques may be used such as for example those described in U.S. Provisional Patent Application 61/713,738 entitled Interest Analytics by Gaze Analysis and filed on Oct. 15, 2012, now published as WO 2014/061017 which was published on Apr. 24, 2014, and which is incorporated in its entirety herein by reference. One or more features of a head or face may be detected. A face may be detected in an acquired image by application of a face detection algorithm or object detection algorithm. For example, a real time face detection algorithm may be applied. Such an algorithm may include utilizing the Viola-Jones object detection algorithm (using Haar features), or various other face detection and eye tracking algorithms included in the Open Source Computer Vision Library (OpenCV) or elsewhere. Application of such a face detection or object detection algorithm may detect boundaries of one or more features of a face image in an acquired frame (e.g., features of a face such as an eye strip, an eye region, a nose, or glasses). Application of the face or object detection algorithm may indicate boundaries (e.g., based on a known relationship among facial elements) of one or more regions of the face, such as an eye region.

In some embodiments, a gaze point of a user may be calculated by for example calibrating a gaze point of the user, and then tracking the position of the eye or iris of the user relative to a known point in 3D space whose position may be calculable relative to movements of the iris. One way of calculating a gaze point may include shining an Infra Red (IR) LED from a know point relative to the view screen, and then calculating a movement of the reflection of the IR relative to the known location of the LED. Another method may calculate a position of an iris relative to for example a known point at a corner of an eye, or a nose, head or other feature or reference point whose movement and position in 3D space may not depend on movement of the iris. A position or an iris and a position of another feature or object in 3D space whose movement is not dependent on or tied to the position of the iris may allow extending a line of gaze to a point on or near a display to calculate the object, element or point that is the subject of the gaze of the viewer.

A determination or calculation of a point of gaze being at or near an edge of a display, or beyond an edge of a display may be used as a trigger for a scroll function of the displayed content such as text or images.

In some embodiments, upon a determination that a point of gaze is at or near a border or edge, and a trigger of a scroll is undertaken, a scroll may continue or move the text or image to for a example a center or top of the screen or display, or by some other fixed number of pixels of distance of the display. In some embodiments, a trigger of a scroll may initiate a scroll that continues for so long as the calculated gaze point is in the area of the screen that triggered the scroll. For example, a calculated gaze point at a bottom edge of a screen may trigger a scroll of text upwards, when or each time that the gaze point leaves the edge of the screen and rises towards the center of the screen, the scroll may stop or slow down. In some embodiments, a relatively continuous scroll may be maintained as is needed to keep the gaze point just above the edge of the screen. Such a relatively continuous scroll may initiate a smooth pursuit response in the eyes of the user as they lock onto the moving text or image. A smooth pursuit response may create a natural feel to the scroll that may allow a user to barely perceive of the scroll and movement of the text since his eyes are locking onto the smooth movement of the text. In some embodiments, the speed of the scroll may reflect the speed of the smooth pursuit of the eyes, or the speed of the text may be altered so that the scroll continues smoothly as long as there is a smooth pursuit of the eyes that is detected.

In accordance with an embodiment of the present invention, movement of a gaze of a user viewing displayed content on a display screen is tracked. Movement of the gaze direction toward a boundary of the user's comfort range may be detected. For example, the direction of gaze may have entered a region of gaze directions adjacent to a boundary of the user's comfort range (hereinafter, a "scroll zone"). A section of the displayed content at a point toward which the user's gaze is directed (hereinafter, a "gaze point") may be identified. The gaze point may defined in a plane of the display screen, or in another plane parallel to the display screen. The displayed content is then automatically scrolled such that the identified section is displayed within (e.g., near the center of, or near an opposite boundary of) the user's comfort range.

Gaze-based control of displayed content may be applied in other ways. For example, an application or function may be activated when the user's gaze is directed at a particular region of a display screen (e.g., a video player application may be activated when the gaze point at a video viewing window). Other applications of gaze tracking are possible.

In accordance with an embodiment of the present invention, the gaze of a user who is viewing displayed content on a display screen is tracked. On the basis of the tracked gaze, a gaze point of the user on the displayed content may be calculated, and thus likewise tracked. (The gaze point may be calculated approximately, such that the gaze point represents a region of the displayed content). As the user examines the displayed content (e.g., reads a displayed document or follows a route on a displayed map), the tracked gaze point may move across the displayed content.

The tracked gaze point may reach a region of a scroll zone. The scroll zone may be defined as the vicinity of, such as a band adjoining the perimeter of, a boundary of the user's comfort range. Alternatively or in addition, the scroll zone may be defined to be in the vicinity of or adjoining an edge of the display screen, or of a display region of the display screen, e.g., a display window, that is designated for displaying scrollable displayed content. In such a situation, it may be assumed that the user wishes to view content that (e.g., in accordance with the structure of a displayed document) is arranged adjacent to the displayed content in that region of the scroll zone. Alternatively or in addition, it may be assumed that the user wishes to view a portion of the content that is displayed at that region closer to the center of the display screen or display region. Thus, the displayed content may be automatically scrolled (for example, displaying additional lines of text, an adjacent region of a map or image, or another item in a list, such as a page of a book, a picture in a gallery, or an article or other item in a list). The automatic scrolling may enable viewing further content, or fully viewing content that was only partially displayed prior to scrolling.

The direction of automatic scrolling may be determined by the location of the gaze point within the scroll zone. The scrolling direction may be such that additional content is displayed in the vicinity of the content at the gaze point. For example, if the displayed content includes displayed text (e.g., and is constrained to scroll up or down only) and the location of the gaze point in the scroll zone is near the last lines of displayed text (near the bottom of the display window), the scrolling direction may be upward so as to display the following lines of the text. On the other hand, a gaze point near the first lines of displayed text (near the top of the display window) may be interpreted as a desire to read a preceding section of the text. In this case, the text may be automatically scrolled downward so as to display the preceding text. In some cases (e.g., when the displayed content includes a picture, map, diagram, or other two-dimensional content), additional scroll directions may be enabled. For example, a gaze point near a right or left side may initiate horizontal automatic scrolling. As another example, a gaze point near a corner may initiate automatic scrolling in a diagonal direction.

In accordance with embodiments of the present invention, a device may be configured for gaze-based automatic scrolling.

FIG. 1 is a schematic diagram of a device that may be configured for gaze-based automatic scrolling, in accordance with an embodiment of the present invention.

Device 110 may include one or more intercommunicating devices. The devices may be mobile or fixed. For example, device 110 may include one or more of a desktop computer or computer terminal, or a portable device. A portable device may include a handheld computer, tablet computer, e-book reader, video disk player, mobile phone, or a smart phone.

Device 110 includes display screen 114. Display screen is configured to display scrollable content.

Device 110 includes an imaging device represented by video camera 112. Video camera 112 may be understood to include any device (e.g., operating to acquire images using visible, infrared, or other radiation), such as a camera, three-dimensional imager, Infra Red light emitting diode (IR LED), scanner, or other device a that is capable of acquiring a series of frames that contain images, or other spatial information, regarding an imaged object, such as a user's eyes, face, head, or body. Video camera 112 may be built into, attached to, or otherwise incorporated into device 110, or may be placed at a fixed position relative to display screen 114.

Device 110 includes, or is associated with, processor 116. Processor 116 may receive a video signal, or other video or image data from video camera 112. Processor 116 may control or determine content that is displayed on display screen 114. Processor 116 may operate in accordance with programmed instructions.

Programmed instructions for operation of processor 116 may be stored on data storage unit 118. Programmed instructions may include instructions for gaze-based automatic scrolling in accordance with an embodiment of the present invention. Data storage unit 118 may include one or more fixed or removable, non-volatile or volatile, data storage units or computer-readable media that is capable of storing data for use by processor 116. Data storage unit 118 may be used to store, e.g., in the form of frames, video or image data that is acquired using video camera 112. Data storage unit 118 may be used to store data for use by processor 16 in displaying an image on display screen 114. Data storage unit 118 may be used to store one or more parameters for operation of processor 116, or one or more results of a calculation performed during operation of processor 118.

Processor 116 may control display of an image, e.g., of textual or graphical content, on display screen 114. For example, processor 116 may control scrolling, panning, or zooming of the displayed content. Processor 116 may be configured to modify displayed content on display screen 114 in accordance with a result of gaze-based automatic scrolling.

In accordance with an embodiment of the present invention, when a gaze point moves into a scroll zone, displayed content may be scrolled.

Figure 2:
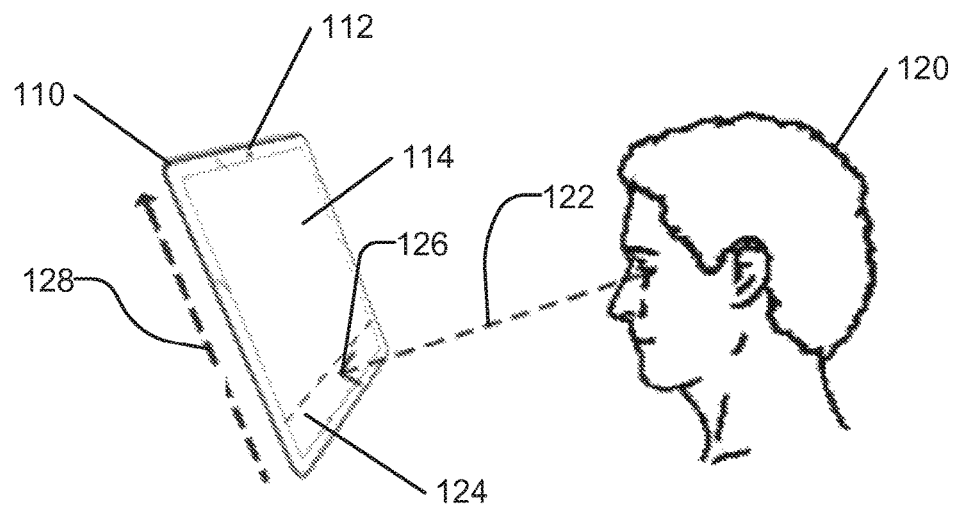
FIG. 2 schematically illustrates a scroll zone for gaze-based automatic scrolling, in accordance with an embodiment of the present invention.

FIG. 2 schematically illustrates a scroll zone for gaze-based automatic scrolling, in accordance with an embodiment of the present invention.

User 120 views display screen 114 of device 110. Scroll zone 124 is defined as a region of display screen 114. For example, scroll zone 124 may be located at a predefined position relative to boundaries or coordinates of display screen 114. As another example, scroll zone 124 may be located at a position that is defined by a program or application that is being executed by device 110. Scroll zone 124 may be located at a position relative to a display window that is defined by programming (and which may, at different times, be displayed at various locations on display screen 114). Alternatively or in addition, scroll zone 124 may be located at a position relative to a predefined comfort range. In some embodiments, a scroll zone may be referenced to an area that is beyond a boundary or border of the display screen 114. Scroll zone 124 may adjoin an edge of display screen 114, a boundary of a display window, or a boundary of a comfort range.

Some embodiments a calculation of a gaze point may be initiated or refreshed with a calibration of an object being looked at by the user. User 120 looks in gaze direction 122 at gaze point 126 on screen 114. If (as is shown in FIG. 2) gaze point 126 is located within scroll zone 124, displayed content on display screen 114 may be scrolled. Displayed content may be scrolled in a direction that is indicated by scroll direction 128. For example, scrolling of displayed content in scroll direction 128 may cause content of a document that was not displayed prior to scrolling, and that is adjacent (e.g., in a document) to the displayed content in scroll zone 124 to be displayed. A corresponding region (e.g., same area or number of lines) of content that was displayed prior to scrolling at an end of display screen 114 (or of a display window within display screen 114) toward which scroll direction 128 is directed (e.g., the top in the example shown in FIG. 2) is no longer displayed. Alternatively or in addition, a portion of the displayed content that was displayed at gaze point 126 is moved toward the center of the scrollable displayed content. ("Scrollable displayed content" may be understood as excluding any displayed content that is outside a window, edit box, picture, frame, or other screen component or control in which content may be scrolled.) Scroll direction 128 may be described as a direction from gaze point 126 toward a center of the scrollable displayed content.

In accordance with an embodiment of the present invention, displayed content may be automatically scrolled only when the gaze point is moved outside a defined display region. For example, the defined display region may include a display window, a comfort range, or a display screen of a device. Alternatively or in addition, automatic scrolling may be initiated by a movement of the gaze point both within and beyond the defined display region.

In accordance with an embodiment of the present invention, an initial gaze direction or initial gaze point may be defined. For example, an initial gaze point may be defined as a center point (or region) of a defined display region. An initial gaze direction or point may be otherwise defined during a setup, initialization, or calibration procedure (e.g., by prompting the user to look at a displayed object, at another predefined point, or in another predefined direction). A subsequent gaze point may be characterized by a displacement vector relative to the initial gaze point. Similarly, a subsequent gaze direction may be characterized by an angular displacement vector relative to the initial gaze direction. A characteristic of automatic scrolling of displayed content may be determined by one or more characteristics of the displacement vector.

Figure 3:
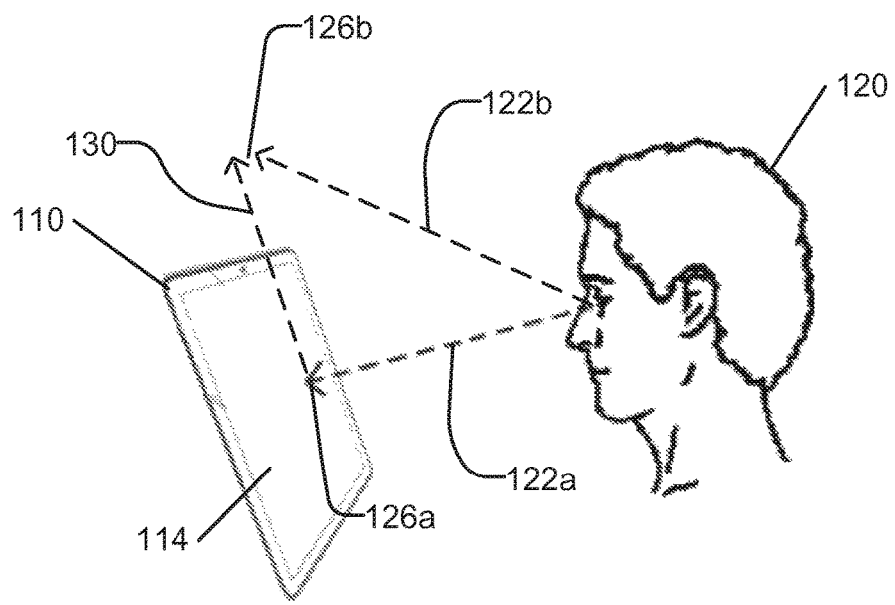
FIG. 3 schematically illustrates a gaze vector for gaze-based automatic scrolling, in accordance with an embodiment of the present invention.

FIG. 3 schematically illustrates a gaze vector for gaze-based automatic scrolling, in accordance with an embodiment of the present invention.

Initial gaze direction 122*a* or initial gaze point 126*a*, or both, may be defined (e.g., automatically or by a user interacting with device 110). At a later point user 120 looks in new gaze direction 122*b*. New gaze direction 122*b* may be directed toward display screen 114 or may (as shown in FIG. 3) be directed toward a point beyond or outside an edge of display screen 114. When new gaze direction 122*b* is directed beyond an edge of display screen 114, new gaze point 126*b* may be defined as an intersection of a line coinciding with new gaze direction 122*b* with a plane of display screen 114. New gaze point 126*b* (or new gaze direction 122*b*) may be characterized by displacement vector 30 relative to initial gaze point 126*a* (or initial gaze direction 122*a*).

In accordance with an embodiment of the present invention, a speed of automatic scrolling may be determined a function of a magnitude of displacement vector 130. A direction of automatic scrolling may be similarly determined by the direction of displacement vector 130. For example, the direction of automatic scrolling may be opposite the direction of displacement vector 130.

In accordance some embodiments of the present invention, displayed content is automatically scrolled only when the magnitude of displacement vector 130 falls in a range between minimum and maximum values.

In accordance with an embodiment of the present invention, a direction of automatic scrolling may be constrained. For example, only vertical or horizontal scrolling may be enabled. Such constraints on scrolling direction may be determined by an application that causes display of the content. The constraints may be context dependent (e.g., dependent on a mode of device 110, or on a characteristic or type of content being displayed). A constraint in scroll direction may be imposed by a user, or by limitations of device 110 or of display screen 114.

For example, when automatic scrolling is constrained to one scrolling dimension (e.g., up and down), a speed or direction of automatic scrolling may be determined by a component of displacement vector 130 that is parallel to the scrolling dimension (e.g., a vertical component of displacement vector 130). Characteristics of other components may be ignored, or otherwise utilized. Thus, if displacement vector 130 is diagonal in the plane of display screen 114 (e.g., directed toward a corner of display screen), then a characteristic (e.g., speed or scroll direction) of the automatic vertical scrolling is determined only by characteristics of the vertical component of displacement vector 130. For example, if user 120 looks toward a bottom-right corner of display screen while automatic scrolling is constrained to up or down, a horizontal (e.g., x-) component of the resulting displacement vector 130 may be ignored, with characteristics of automatic scrolling being determined by the vertical (e.g., y-) component.

In accordance with an embodiment of the present invention, automatic scrolling may be configured to scroll the displayed content sufficiently to show a previously partially obscured screen object. For example, when a gaze point is moved to a partially displayed screen object at the edge of a display screen or other defined display region, the displayed content may be scrolled by a distance or dimension sufficient to display the entire screen object. For example, the screen object may include a page or paragraph of text, a picture or other graphic object, a screen control, or screen object. The automatic scrolling may be configured to scroll the screen object such that it is centered in the display region, or such that it is displayed near an edge of the display region. When the screen object is too large to be displayed in its entirety in the display region, the automatic scrolling may cause a predetermined portion of the screen object to be displayed (e.g., a predetermined number of lines of text) or a part of text or area of an image that does not at such time appear on the screen.

In accordance with some embodiments of the present invention, gaze-based automatic scrolling may be dependent on the length of a time interval for which the gaze is maintained. For example, the gaze point may be moved to a scroll zone, to a partially displayed screen object, or to another position such that automatic scrolling is indicated. Automatic scrolling, however, may commence only after the gaze point remains at that position for a predetermined period of time. For example, the predetermined time may include a minimum or threshold time interval. (For example, a time threshold may prevent unintentional scrolling due to an involuntary or momentary eye movement.)

In accordance with some embodiments of the present invention, a rate or speed of automatic scrolling may be configured to enable a user's eyes to comfortably follow the scrolled content. For example, the automatic scrolling may be sufficiently slow or gradual to enable comfortable and natural following of the displayed content by eye movements. For example, when text or element scroll up if the eyes follow the moving text (as they naturally may do) the eyes point of gaze leave the "scroll zone" when the text scrolls high enough. In some embodiments, a scrolled amount or speed of a scroll may reflect a smooth pursuit of the eyes of user so that the scroll may continue when the eyes of the user have locked onto the text in a smooth pursuit.

Figure 4:
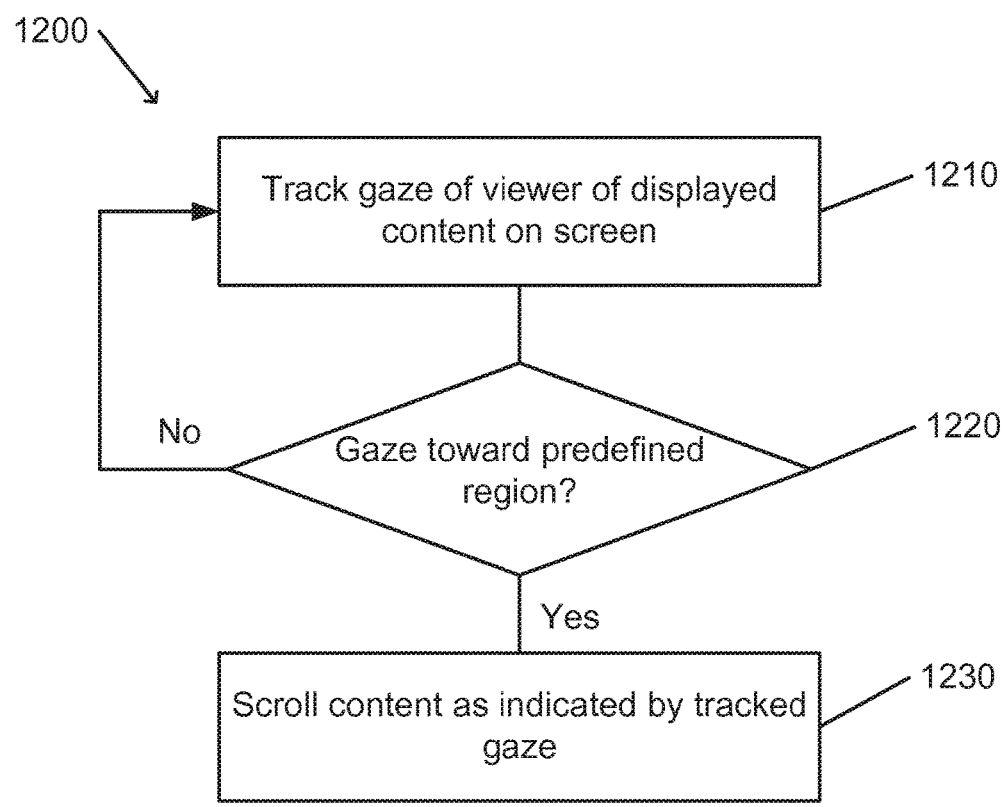
FIG. 4 is a flowchart depicting a method for gaze-based automatic scrolling, in accordance with an embodiment of the present invention.

FIG. 4 is a flowchart depicting a method for gaze-based automatic scrolling, in accordance with an embodiment of the present invention.

It should be understood with respect to any flowchart referenced herein, that the division of the depicted method into separate operations represented by blocks of the flowchart has been selected for convenience only. Alternative division of the depicted method into discrete operations is possible with equivalent results. Such alternative division of the depicted method into discrete operations should be understood as representing embodiments of the present invention.

Furthermore, it should be understood that unless indicated otherwise, that the illustrated order of operations of the depicted method as represented by the positions of the blocks in any flowchart referenced herein has been selected for convenience only. Execution of the illustrated operations in alternative order, or concurrent execution of operations of the depicted method, is possible with equivalent results. Any such reordering of operations of the depicted method should be understood as representing an embodiment of the present invention.

Gaze-based automatic scrolling method 1200 may be implemented by a processor of (e.g., incorporated in or associated with) a device that is configured for gaze-based automatic scrolling. For example, gaze-based automatic scrolling method 1200 may be executed as part of execution of a program that is displaying content on an electronic screen.

A gaze of a viewer of displayed content on an electronic display screen is tracked (block 1210). For example, frames containing images of the eyes or face of the viewer may be acquired by an imaging device that is at a fixed location relative to the display screen. The images may be analyzed so as to determine the position of the eyes and face relative to one another and to the display screen or relative to a point or reference in 3D space. In some embodiments, Gaze tracking may yield a gaze direction (e.g., relative to a point on the display screen) or a gaze point (e.g., in a plane of the display screen).

The gaze may be directed in a direction toward a predefined region in the plane of the display screen (block 1220). The predefined region may include a section of a large region or scroll zone. For example, a predefined range may be within a predefined scroll zone, e.g., adjoining or near the edge or boundary of a comfort range, or of a programming-defined display window. The display region may include as section of the display screen (e.g., adjoining an edge of the display screen), or a region of the display screen. The predefined region may lie external to or outside of an edge of the display screen.

If the gaze is not directed toward a predefined direction, gaze tracking continues (block 210).

If the gaze is directed toward a predefined direction, the displayed content is automatically scrolled on the display screen as indicated by the tracked gaze (block 1230). For example, the content may be automatically scrolled such that content that is displayed near the tracked gaze point (e.g., near an edge of a display region) is displayed closer to a center of the display region as a result of the scrolling. The content may be automatically scrolled such that content of a partially displayed document that was not displayed prior to automatic scrolling is displayed as a result of the scrolling. Concurrently, content that is displayed in another part of the display region (e.g., near an edge the display region that is opposite the gaze point) is no longer displayed after the scrolling.

In accordance with embodiments of the present invention, an orientation of a body part of a viewer of a displayed image may be detected. The detected orientation may be utilized to calculate a relative orientation between a device that is displaying the image and a face of a user of, or of a viewer of the image. For example, the image may be displayed on an electronic display screen of a mobile or handheld device. For example, a mobile device may include a mobile phone, smartphone, handheld computer, tablet computer, or other device. Such a detected relative orientation may be utilized in adjusting an orientation of an image that is displayed on the electronic display screen of the device. An image whose orientation is adjusted may be an entire displayed image, or an element of the entire image. An element may refer to a region of the image, an image of an object in a displayed scene or document, a displayed screen object or control of a user interface, or any other component of an image.

For example, the orientation of an image that is displayed on the display screen may be adjusted to match a detected orientation of a part of the user's body, such as the user's face or eyes. Such adjustment may ensure that the displayed image is at an angle that may be aligned with or comfortably viewed by the user. It should be understood that in the following discussion, detection of an orientation of a user's eyes may be understood as representing detection of an orientation of any body part (e.g., face, facial feature, neck, shoulders, torso, or other body part) whose detected orientation is at least approximately indicative of the orientation of the eyes.

An orientation of a displayed image, as used herein, may refer to an orientation of a nominally (e.g., as originally filmed, generated, or drawn) horizontal (top or bottom) or vertical edge (right or left) of the displayed image relative to a corresponding edge of the display screen (assuming both the image and screen to be substantially rectangular). An orientation of a body part refers to an orientation of a line that is assumed to be parallel to a line that connects the user's eyes (or from which the orientation of such a line may be inferred). An orientation of the displayed image relative to a body part refers to an orientation of a nominally horizontal edge of the displayed image relative to the orientation of a line that connects the user's eyes (or of another line that is assumed to be parallel to the line connecting the user's eyes).

Such an adjustment based on relative orientation detection may be advantageous over automatic adjustment of display orientation that is based on determination of the vertical (e.g., using a gravity-based tilt meter or accelerometer measurement). As a opposed to a gravity-based adjustment, relative orientation detection in accordance with embodiments of the present invention may enable adjustment of the imager orientation (e.g., to a comfortably-viewable orientation) under circumstances such as when the device is lying flat on a horizontal surface, or when the user's face is tilted with respect to the vertical (e.g., leaning or lying). Thus alignment of the displayed image with the user's viewing angle may be enabled even when a mobile device is lying flat on a horizontal surface (where a gravity-based orientation sensor would be unable detect the user's viewing angle). Alignment of the displayed image with the user's viewing angle may be enabled even when the mobile device is held vertically and the user is leaning (e.g., to one side) or lying (whereas orientation based on a gravity-based orientation sensor would cause the image to be displayed vertically).

In accordance with embodiments of the present invention, the displayed image, or elements of the displayed image, may be rotated or otherwise manipulated on the basis of detection or tracking of the position and orientation of the user's head (or eyes or other body part) relative to the device.

In accordance with an embodiment of the invention, a user may view a display that is incorporated into, associated with, or otherwise tiltable together with a camera or other imaging component that is likewise incorporated into or associated with the device. The camera acquires an image or series of frames of the user's face or eyes. The camera may include a video camera that acquires a sequence video frames (e.g., for use with eye tracking as described above), or a camera that is configured to acquire single images. The camera may include a three-dimensional imaging pair, or an infrared camera, infra-red light emitting diode or other infra red device.

A processor of the device may be configured to detect a position or orientation, or an estimated position orientation of the user's head relative to the device. The processor may be configured to continuously, periodically or at other intervals track the relative orientation of the user's head, or to check and track changes in the orientation at periodically or at otherwise determined intervals. The processor may be configured to detect and track a face, eyes, eye pupils or irises, or other facial features using one or more detection or tracking algorithms for objects (or specific to faces, eyes, eye pupils or irises, or other facial features). For example, the processor may utilize algorithms such as those that are available in the Open Source Computer Vision Library (openCV). The device or processor may utilize object or face tracking systems or technologies such Microsoft Kinect, Tobii T60, or another system or technology.

In some embodiments, a detected change in orientation of a viewer may trigger a re-orientation of a layout of content that is displayed on a screen, such as from portrait to landscape, or partially portrait and partial landscape—i.e. orientation at an angle. In some embodiments, a quantity of data that appears in a first orientation may need to be adjusted to accommodate the change in orientation. In some embodiments, an orientation of a display may be altered in near real time to match the detected or tracked movements of the user. In some embodiments, after the real-time orientation is adjusted, a more permanent or extended re-orienting of the display into for example portrait or landscape may be adopted.

In some embodiments, a position of a viewer may be tracked periodically or continuously and the orientation of the viewer may be varied or adjusted to match such tracked position. Tracking continuously or periodically may conserve resources such as battery and processing power, as compared with searching for a position of a viewer.

Figure 5:
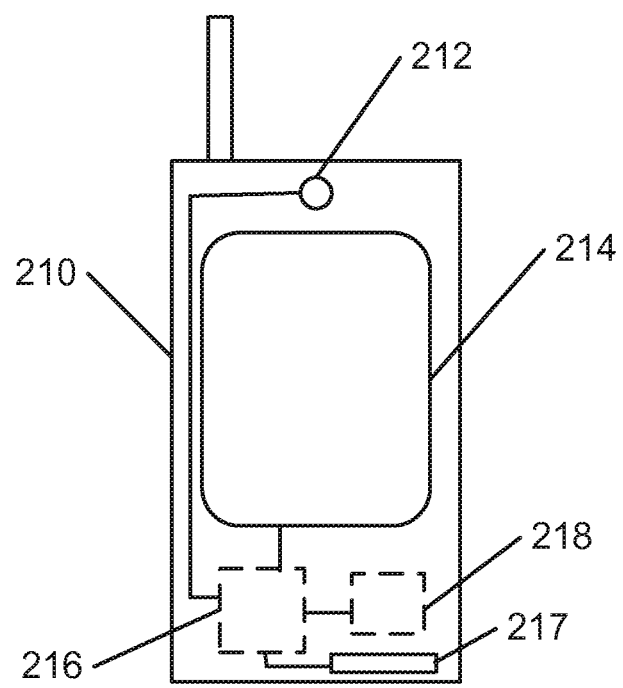
FIG. 5 is a schematic diagram of a device that may be configured for orientation adjustment of a displayed image, in accordance with an embodiment of the present invention.

FIG. 5 is a schematic diagram of a device that may be configured for orientation adjustment of a displayed image, in accordance with an embodiment of the present invention.

Device 210 may include a portable computing device, such as a handheld computer or smart phone. Device 210 includes a video camera 212.

Device 210 may include a motion sensor 217. Motion sensor 217 may include one or more sensors for measuring a change in velocity, rotation, or orientation of device 210. For example, motion sensor 217 may include an accelerometer, a gyroscope, compass, level, or other component capable of detecting a change in velocity or orientation of device 210.

Device 210 includes processor 216. Processor 216 may receive a video signal, or other video or image data from video camera 212. Processor 216 may operate in accordance with programmed instructions.

Programmed instructions for operation of processor 216 may be stored on data storage unit 218. Programmed instructions may include instructions for orientation adjustment of a displayed image in accordance with an embodiment of the present invention. Data storage unit 218 may include one or more fixed or removable, non-volatile or volatile, data storage units or computer-readable media that is capable of storing data for use by processor 216. Data storage unit 218 may be used to store, e.g., in the form of frames, video or image data that is acquired using video camera 212. Data storage unit 218 may be used to store data for use by processor 216 in displaying an image on display screen 214. Data storage unit 218 may be used to store one or more parameters for operation of processor 216, or one or more results of a calculation performed during operation of processor 218.

Processor 216 may control display of an image, e.g., of textual or graphical content, on display screen 214. For example, processor 16 may control scrolling, panning, or zooming of the displayed content. Processor 216 may be configured to modify displayed content on display screen 14 in accordance with a result of tracking of a body part.

Figure 6:
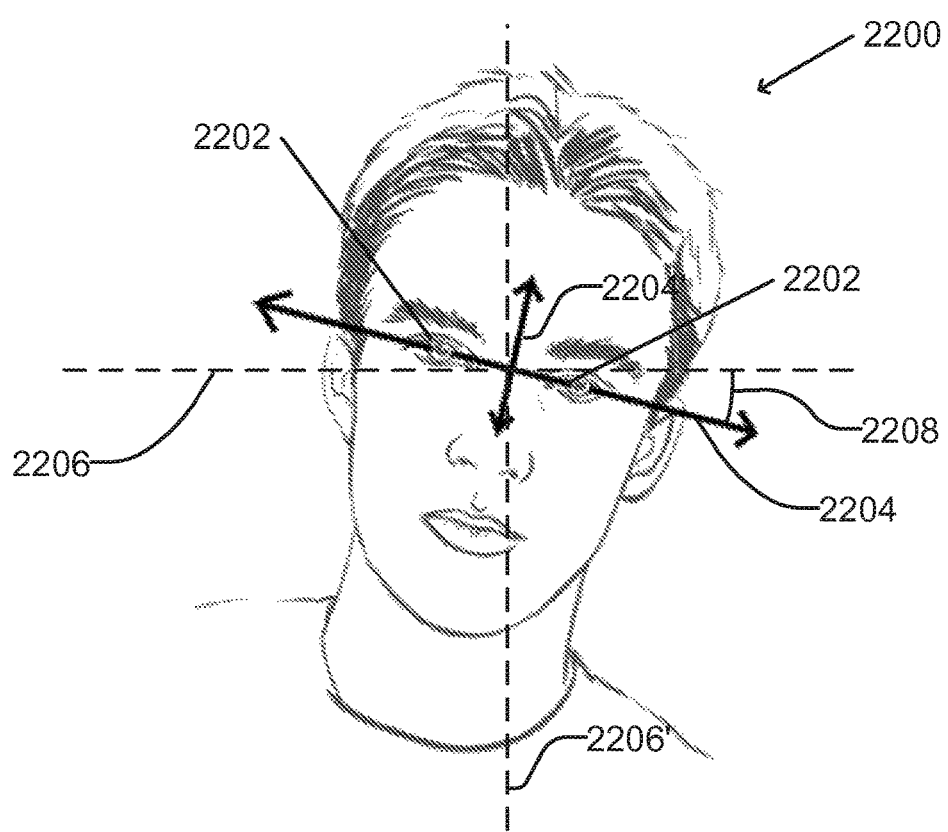
FIG. 6 schematically illustrates utilization of a face image for use in orientation adjustment, in accordance with an embodiment of the present invention.

FIG. 6 schematically illustrates utilization of a face image for use in orientation adjustment, in accordance with an embodiment of the present invention.

Face image 2200 may have been acquired by an image capture device (e.g., camera or video camera, hereinafter referred to as a camera) of a mobile device. The position, alignment, and orientation of the camera relative to a display screen of the mobile device may be known (or the camera and display screen may be assumed to be close to one another or coincide). Eye images 2202 may be located within face image 2200. Determination of locations of eye images 2202 enables (e.g., using standard two-point determination of a line equation) definition of eye line 2204 through eye images 2202, or of line 2204' that is perpendicular to eye line 2204. Eye line 2204 may be tilted with respect to horizontal device axis 2206 or to vertical device axis 2206'. For example, device axes 2206 and 2206' may represent lines that represent a current orientation of a displayed image. As another example, device axes 2206 and 2206' may represent lines that are parallel to edges of rectangular display window of the device, or to any other definable direction relative to the device or its display (e.g., a diagonal). A tilt of eye line 2204 relative to horizontal device axis 2206 may be represented by tilt angle 2208 (or, equivalently, of any other angle between either of eye line 2204 or line 2204' and either of horizontal device axis 2206 or vertical device axis 2206').

In accordance with embodiments of the present invention, an orientation of a face of a user who is viewing a display may be utilized to adjust the orientation of the displayed image. The orientation of the user's face, e.g., as defined by tilt angle 2208, may be calculated relative to the currently displayed image. The displayed image may then be rotated so as to align the displayed image with the user's face.

Calculation of an orientation of the user's eyes of face may be calculated relative to an expected or target relative orientation between the eyes and the displayed image. An expected orientation may represent an estimated alignment of the user's face with the displayed image for comfortable viewing of the image. The calculation may take into consideration a relative position of the camera to the display screen of the device. For example, if the camera and display screen are linearly displaced from one another, the calculation may include translating the axes of the coordinate system of the display screen or of the camera by a corresponding distance. Similarly, the face image may be analyzed (e.g., from ratios between various detected facial features) to reveal an elevation angle of the face relative to a plane of the display screen or a distance of the face from the display screen, or both. This information may also be utilized in the calculation.

Once the expected orientation is calculated, all or part of the displayed image may be rotated or otherwise manipulated (e.g., foreshortened, shifted, or enlarged/reduced) to achieve the expected relative orientation.

Figure 7A:
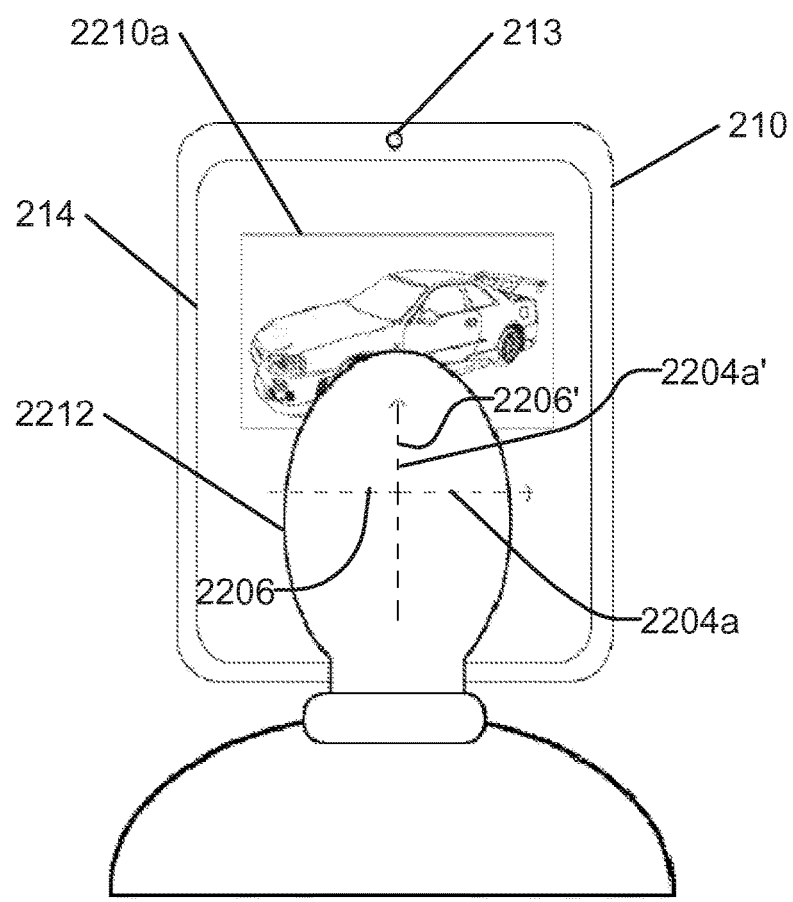
FIG. 7A schematically illustrates alignment of a user's head with a display screen.

FIG. 7A schematically illustrates alignment of a user's head with a display screen.

User head 2212 is upright with respect to display screen 214 of device 210. Thus, the eyes (not shown) are arranged along a horizontal eye line 2204a. Horizontal eye line 2204a is thus parallel to, and may be drawn as coinciding with, horizontal device axis 2206 (corresponding to a zero tilt angle). Thus, upright image 2210a may be displayed on display screen 214 as shown, aligned with horizontal eye line 2204a.

Figure 7B:
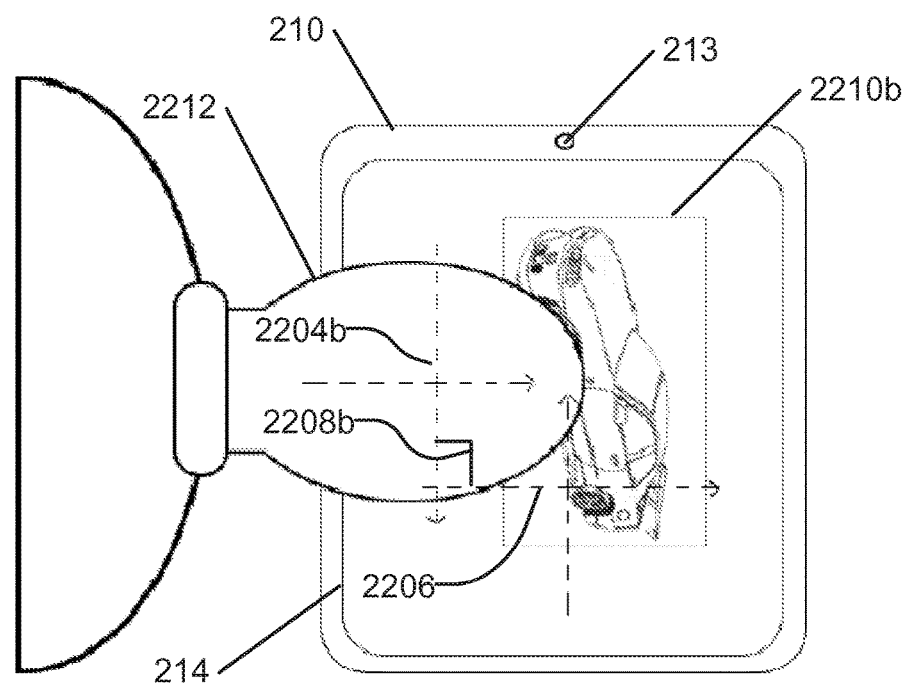
FIG. 7B schematically illustrates orientation adjustment in accordance with an embodiment of the present invention when the user's head is tilted by a right angle relative to the display screen.

FIG. 7B schematically illustrates orientation adjustment in accordance with an embodiment of the present invention when the user's head is tilted by a right angle relative to the display screen.

As shown in FIG. 7B, user head 2212 is tilted at a 90° angle with respect to display screen 214. When camera 213 images user head 2212, analysis of acquired images shows that the user's eyes are arranged along vertical eye line 2204b. Thus, vertical eye line 2204b is at approximately a 90° tilt angle 2208b relative to horizontal device axis 2206. Therefore, as shown, reoriented image 2210b is displayed on display screen 214 as rotated by 90° tilt angle 2208b, and is aligned with vertical eye line 2204b.

Figure 7C:
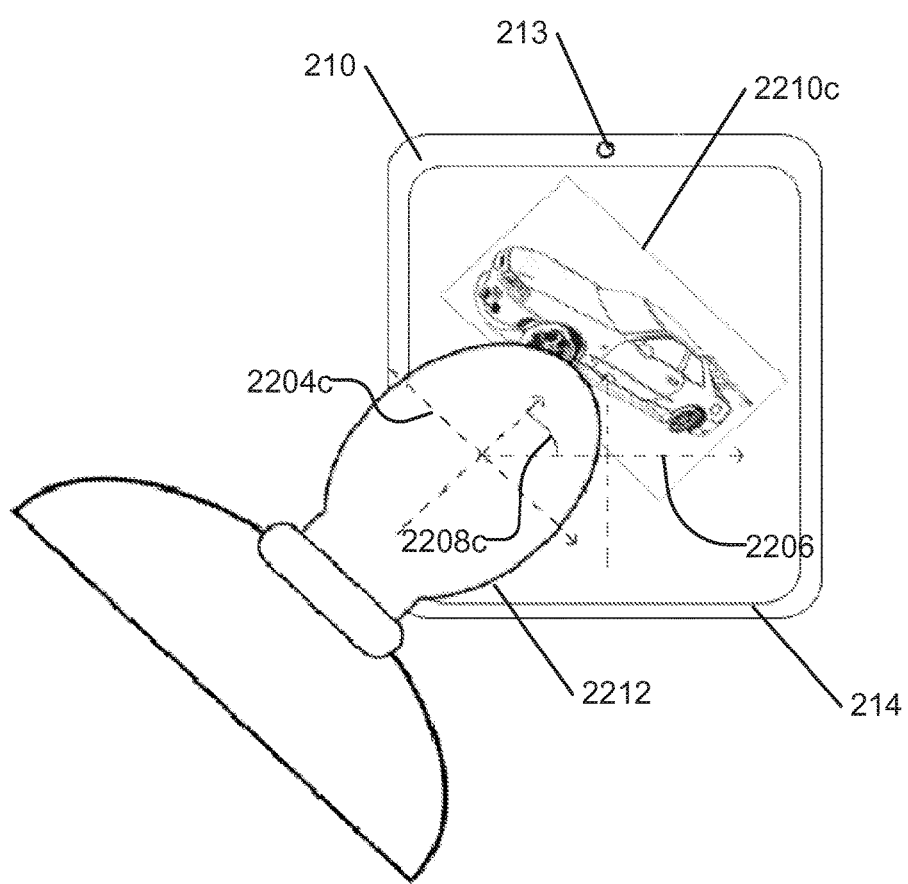
FIG. 7C schematically illustrates orientation adjustment in accordance with an embodiment of the present invention when the user's head is tilted by an angle relative to the display screen.

FIG. 7C schematically illustrates orientation adjustment in accordance with an embodiment of the present invention when the user's head is tilted by an angle relative to the display screen.

As shown in FIG. 7C, user head 2212 is tilted at an angle (approximately 45°) with respect to display screen 214. When camera 213 images user head 2212, analysis of acquired images shows that the user's eyes are arranged along inclined eye line 2204c. Thus, inclined eye line 2204c is at a non-zero (approximately 45°) tilt angle 2208c with respect to horizontal device axis 2206. Therefore, as shown, reoriented image 2210c is displayed on display screen 214 as rotated by (approximately 45°) tilt angle 2208c, and is thus aligned with inclined eye line 2204c.

In accordance with an embodiment of the present invention, the system may continuously or periodically track changes in the orientation of the user's head relative to the device. Such changes may be caused by a movement of the user, movement of the device, or both. For example, when a user is holding the device while shifting from a sitting to a leaning or lying position, or vice versa, the displayed image remains aligned with the user's eyes.

In accordance with some embodiments of the present invention, the image is adjusted only when the change in orientation is greater than a threshold value. For example, an alignment of a displayed image within a range of alignments (e.g., 10°-20°, or another threshold relative to the eye alignment) may be determined to still provide a comfortable viewing angle for the user.

In accordance with other embodiments, the orientation of the displayed image may be limited to several fixed orientations. For example, there may be four orientation options: portrait and landscape, upright and inverted. In this case, a threshold angle for a transition from one orientation option to another may be approximately 45°. More orientation options may be allowed (e.g., an additional four diagonal orientations with a transition threshold of about 22.5°, or more orientation options).

In accordance with some embodiments of the present invention, the orientation of a subset of elements of a displayed image may be adjusted, while others are not. For example, the adjustment may be limited to one or more elements of the displayed image that are considered to be critical (e.g., because proper operation of an application, program, function, or device that is associated with that element requires the user to constantly monitor that element). As another example, the adjustment may be limited to one or more displayed elements that would be difficult for a user to read, comprehend, or monitor (e.g., to observe and comprehend the content of that displayed element) when not presented in an optimal orientation with respect to the user's eyes (e.g., text, symbol, graph, diagram, map, analog clock image, or another orientation-sensitive image element).

Alternatively, tilt angle thresholds for adjusting various elements of the displayed image may differ from one another. For example, the orientation of some of elements of the image may be adjusted to continually remain aligned with the user's eyes, while other image elements, or the displayed image as a whole, may be adjusted as needed between a portrait and landscape orientation.

In accordance with some embodiments of the present invention, the orientation of eyes of two or more users with respect to a display screen of a device may be detected concurrently or alternately. A displayed image may be alternately adjusted to an orientation that is suitable for each of the users. For example, two users may be playing a board game (e.g., that has a preferred viewing direction, such as a game that includes text or tiles with alphanumeric characters, e.g., Scrabble®) on a portable device such as a tablet computer. The displayed image may then automatically be adjusted in accordance with the position or orientation of the user whose turn it is. Upon conclusion of that user's turn (e.g., indicated by operation of a control or screen control), the displayed image may be automatically adjusted in accordance with the next user's position and orientation. Thus, the displayed image may be adjusted to face each user in turn, mimicking the effect of a game board mounted on a turntable. During a setup phase, the initial positions of the two or more users may be indicated. Operation may then proceed automatically as long as the eyes of all users remain within the field of view of the device's camera. (If the eyes of one of the users leave the camera's field of view, the setup phase may be repeated.)

Figure 8:
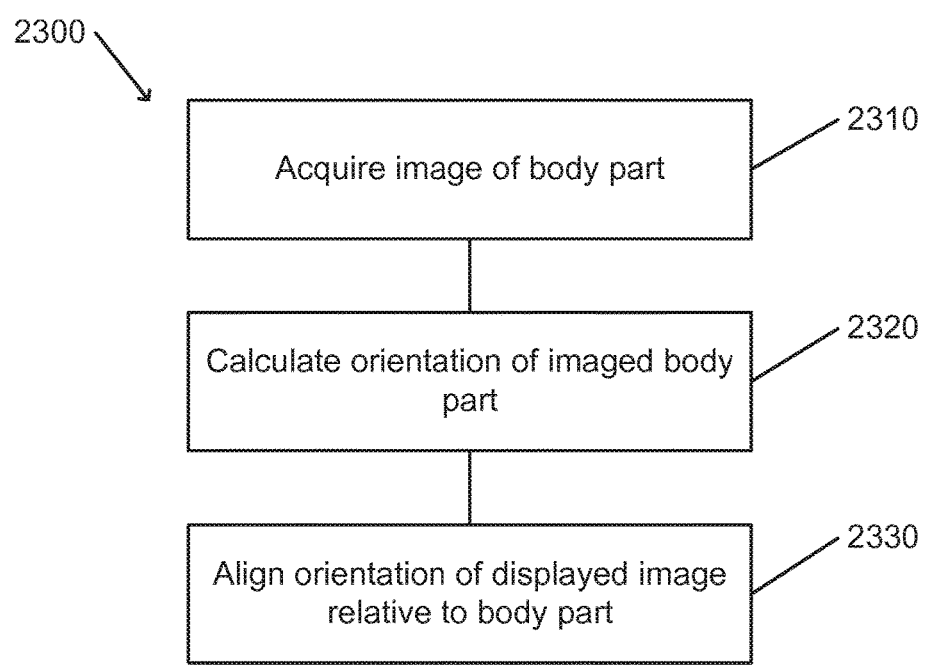
FIG. 8 is a flowchart depicting a method for image orientation adjustment, in accordance with an embodiment of the present invention.

FIG. 8 is a flowchart depicting a method for image orientation adjustment, in accordance with an embodiment of the present invention.

Image orientation adjustment method 2300 may be executed by a processor that is configured to analyzed images or frames that were received from a camera (or data storage device or data buffer) of a mobile device, and that is configured to control display of an image on a display screen of the mobile device. The processor may be incorporated into the mobile device or may be in communication with a processor of the mobile device. The processor may include two or more intercommunicating processing device (e.g., one configured to analyze acquired images and another configured to control image display).

An image of a body part, such as eyes of a user of the mobile device, may be acquired, e.g., from a camera of the mobile device or from another sensor (block 2310). For example, the image may include an acquired image or frame in which the eyes or face of the user are imaged.

An orientation of the imaged body part, e.g., the user's eyes may be calculated from the acquired image (block 2320). The eyes may be detected in an image of the face, or the orientation of the eyes may be inferred or deduced from an identified orientation of the face or of one or more features of the face. For example, the position of the user's eyes in the image may be identified by application or execution of an eye tracking method as described in PCT application No. PCT/IL2013/050072, which is incorporated herein by reference.

Other object, face, or eye detection techniques may be utilized. A face may be detected in a frame by application of a face detection algorithm or object detection algorithm. For example, application of a real time face detection algorithm may include utilizing the Viola-Jones object detection algorithm (using Haar features), or various other face detection algorithms included in OpenCV or elsewhere. Application of such a face detection or object detection algorithm may detect boundaries of a face in a frame (e.g., features of a face such as an eye strip, an eye region, a nose, or glasses). Application of the face or object detection algorithm may indicate boundaries (e.g., based on a known relationship among facial elements) of one or more regions of the face, such as an eye region.

The positions of the identified eyes relative to an orientation of the mobile device may be calculated (e.g., as described above in connection with FIG. 6). Additional identified facial features or characteristics may be utilized to determine further information regarding the position and orientation of the user's eyes relative to the device (e.g., distance or elevation angle).

The orientation of the displayed image may be adjusted by alignment relative to the calculated orientation of the body part (block 2330).

For example, utilizing the calculated orientation of the user's eyes, an expected or target orientation of an image that is displayed on a display screen of the device may be determined. An expected orientation may represent an orientation of the displayed image relative to the orientation of the user's eyes that is expected to enable comfortable viewing of the image by the user. For example, an expected orientation may be parallel to the identified orientation of the user's eyes. An expected orientation may be selected from a finite set of allowed or possible orientations. In this case, the expected orientation may include that orientation of the set which, when applied to the displayed image would cause (a horizontal of) the image to be oriented most nearly parallel or otherwise aligned to the orientation of the user's eyes. The expected orientation may be characterized by a rotation angle relative to the image as currently displayed (prior to rotation).

The displayed image may be rotated through a rotation angle (e.g., by generating an image in which the value of each pixel is calculated by application of a rotation matrix to pixels of the image prior to rotation) so as to match the expected orientation.

Additional criteria may be applied to limit adjustment of the orientation of the displayed image. For example, the orientation of the displayed image may be adjusted only when a difference between the expected orientation and the current orientation of the displayed image exceeds a threshold value. (This may prevent constant jumps in orientation that may be disturbing or distracting to a user.) A minimum time between orientation adjustments may be applied. Adjustment of the orientation of the displayed image may be activated or deactivated by the user.

Image orientation adjustment method 2300 may be executed continuously. For example, upon conclusion of execution of image orientation adjustment method 300, execution of image orientation adjustment method 2300 may be immediately repeated. Alternatively, execution of image orientation adjustment method 2300 may be repeated after a predetermined period of time, or in response to an event (e.g., detected movement of the device by an accelerometer or tilt sensor, operation of a control by the user, display of an image with a preferred viewing direction, or another event).

The invention claimed is:

1. A method for scrolling content that is displayed on an electronic display screen, the method comprising:
 tracking a direction of a gaze of a viewer of the displayed content; and
 scrolling the displayed content on the display screen, upon detection of the tracked gaze direction on a predefined region of the display screen,
 wherein continuous scrolling is maintained while the tracked gaze direction is at the same region of the display screen during scrolling, and wherein the scrolling corresponds to the tracked gaze direction so as to allow smooth pursuit of the eyes of the viewer, and wherein tracking the direction of the gaze comprises calculating a displacement vector from an initial position to the gaze point, and wherein scrolling the displayed content comprises scrolling the content in a direction that is determined by a direction of the displacement vector.

2. The method of claim 1, wherein tracking the direction of the gaze comprises acquiring a plurality of successive images of the viewer by an imaging device that is positioned at known location relative to the display screen.

3. The method of claim 1, comprising altering a speed of the scrolling to reflect a smooth pursuit of an eye of the viewer.

4. The method of claim 1, wherein tracking the direction of the gaze comprises:
 tracking a position of an iris of the user relative to a position of an object in three-dimensional space; and
 calculating a gaze point of the iris based on the tracked position of the iris.

5. The method of claim 1, wherein the predefined region adjoins an edge of the display screen.

6. The method of claim 1, wherein the predefined region adjoins a boundary of a display window.

7. The method of claim 1, further comprising continuing the scroll so long as the gaze direction is in the pre-defined region.

8. The method of claim 1, further comprising continuing the scroll when an iris of the viewer is in a smooth pursuit of the displayed content.

9. The method of claim 1, wherein the scroll is initiated upon detection of the tracked gaze direction on a predefined region external to an edge of the display screen.

10. The method of claim 1, wherein scrolling the displayed content comprises causing a portion of the displayed content that is displayed at the gaze point to move to a location that is nearer to a center of the displayed content.

11. The method of claim 1, wherein scrolling the displayed content comprises causing a portion of the displayed content that is displayed at the gaze point to move to a location that is nearer to a center of a predetermined comfort range.

12. The method of claim 1, wherein scrolling the displayed content comprises scrolling the displayed content in a scroll direction that is directed away from the gaze point and toward a center of the displayed content.

13. The method of claim 1, wherein scrolling the displayed content comprises scrolling the content at a scrolling rate that is determined by a magnitude of the displacement vector.

14. The method of claim 1, wherein scrolling the displayed content comprises scrolling the content through a distance that is determined by a magnitude of the displacement vector.

15. The method of claim 1, wherein scrolling the displayed content comprises scrolling the content through a distance that is sufficient to display in its entirety a screen object at the gaze point.

16. The method of claim 1, wherein scrolling the displayed content comprises scrolling the content only after the gaze point remains in the predefined region for a predetermined period of time.

17. An electronic device, comprising:
a display screen, configurable to display scrollable content;
an imager, located at a known position relative to the display screen and configurable to acquire a series of images of a viewer of the display screen; and
a processor, configured to:
track a point of a gaze of the viewer from the series of acquired images;
determine when the tracked gaze point is at a predefined area; and
scroll the displayed content on the display screen, upon detection of the tracked gaze point on the predefined area,
wherein the processor is configured to continuously scroll the displayed content while the tracked gaze point is at the same area during scrolling, and wherein the processor is configured to scroll in accordance with the tracked gaze point so as to allow smooth pursuit of the eyes of the viewer, and wherein the processor is configured to calculate a displacement vector from an initial position to the gaze point, and wherein the processor is configured to scroll the content in a direction that is determined by a direction of the displacement vector.

18. The device of claim 17, wherein the processor is configured to track the gaze point by estimating an expected size and expected location of an image of an iris within that acquired image, and determining a location of the iris image within the acquired image by identifying a region within the expected location, the size of the region being consistent with the expected size, wherein pixels of the region have luminance values that are darker than pixels of other regions within the expected location.

* * * * *